(12) United States Patent
Goff et al.

(10) Patent No.: US 6,417,894 B1
(45) Date of Patent: Jul. 9, 2002

(54) ADJUSTABLE MAGNIFYING APPARATUS AND METHOD FOR VIEWING VIDEO OR COMPUTER SCREENS

(75) Inventors: James A. Goff, Webster, NY (US); Carl Fisherman, Franklin Lake, NJ (US); Howard Scott Ryan; Paul Eric Carlson, both of Skaneateles, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 0 days.

(21) Appl. No.: 09/063,589

(22) Filed: Apr. 21, 1998

Related U.S. Application Data

(60) Provisional application No. 60/046,724, filed on May 16, 1997.

(51) Int. Cl.[7] .................................................. H04N 5/72
(52) U.S. Cl. ...................................... 348/832; 359/819
(58) Field of Search ................................ 348/779, 782, 348/786, 788, 807, 823, 824, 825, 832, 386; 312/7.2; 359/819, 822, 823; D14/336, 371–382, 448, 452; D34/12; H04N 5/72

(56) References Cited

U.S. PATENT DOCUMENTS

| | | | |
|---|---|---|---|
| 4,080,530 A | 3/1978 | Krogsrud | |
| 4,094,598 A | 6/1978 | Hodges | |
| 4,391,498 A | 7/1983 | Rengstorff | |
| 4,529,268 A | 7/1985 | Brown | |
| 4,577,928 A | 3/1986 | Brown | |
| 4,635,894 A | 1/1987 | Sammons | |
| 4,712,870 A | * 12/1987 | Robinson et al. | 350/243 |
| 4,796,162 A | 1/1989 | Krogsrud | |
| 4,958,907 A | * 9/1990 | Davis | 350/243 |
| 5,048,928 A | 9/1991 | Davis | |
| 5,119,239 A | * 6/1992 | Iaquinto et al. | 359/811 |
| D357,470 S | 4/1995 | Bergdoll et al. | |
| 5,618,020 A | 4/1997 | Hegarty et al. | |

FOREIGN PATENT DOCUMENTS

| | | | |
|---|---|---|---|
| AU | 4493679 | 9/1979 | G02B/25/00 |

* cited by examiner

*Primary Examiner*—Nhon Diep
(74) *Attorney, Agent, or Firm*—Katherine McGuire

(57) ABSTRACT

The present invention is directed to an optical device and method for adjustably magnifying the visual displays on the screen of a computer monitor or the like, the invention comprising an adjustable arm for supporting at least one magnifying lens in front of the monitor, which adjustable arm is attached to a stationary support independent of an operator's body. The adjustable arm for supporting the magnifying lens between the viewer of the screen and the screen of the computer monitor is movable in a substantially axial and vertical direction with respect to the computer screen, so that the magnifying lens can be adjustably positioning to a desired position relative to said screen. The invention is especially useful for helping presbyopic computer operators to more clearly see the visual displays on the screen. A second embodiment of the invention further comprises a second lens that can be used to view a document held next to the monitor.

23 Claims, 9 Drawing Sheets

ADJUSTABLE MAGNIFYING APPARATUS AND METHOD FOR VIEWING VIDEO OR COMPUTER SCREENS

This application claims priority from provisional application Ser. No. 60/046,724, filed May 16, 1997.

FIELD OF THE INVENTION

An optical device for use at a computer work station enables a worker to magnify visual displays on a computer screen. The optical device helps workers to view a screen more easily, in greater detail, or from a more distant location, thereby preventing or reducing eyestrain, back pain, and other problems caused by extensive use of computer screens. The optical device is especially useful for helping workers with presbyopic eyesight to see computer screens.

BACKGROUND OF THE INVENTION

It is well known that the operation of computer monitors, video terminals, and the like in which the operator is required to view a screen for extended periods of time may cause operator eyestrain. The operation of computers has often been the source of back problems, headaches, and other ailments. This is especially true for computer operators, including word processors, secretaries, data processors, designers, financial professionals, or others who spend a considerable amount of time working at computer screens.

Maintaining an ergonomically correct posture may help avoid physical ailments associated with the use of computer screens. An ergonomically correct position, however, may be difficult to maintain under typical circumstances. For example, computer operators must simultaneously view a monitor screen, operate a computer key board and periodically view or write on various documents or files. Computer operators may need to move about and chance work positions or engage in diverse tasks, such as working at an adjacent desk or answering a phone. Such movement may require increased separation from the computer screen and/or a change in the viewing angle. These circumstances can be challenging in terms of maintaining an ergonomically correct position.

Even when maintaining an ergonomically correct position, any difficulty or deficiency in seeing the screen can lead to ailments such as eyestrain or headaches. Yet any visual problems in seeing the screen is likely to make it more difficulty to maintain an ergonomically correct position which will worsen such ailments or potentially lead to additional ailments such as backache or other musculoskeletal disorders or conditions. Moreover, it is not uncommon for such a disorder to insidiously develop over time, even over a period of years, becoming apparent only after the disorder has progressed to a point where it has become serious in nature and/or is difficult to reverse.

Persons who are presbyopic ("presbyopes") have special problems in seeing computer screens. Everyone becomes presbyopic with after, usually beginning after a person reaches the mid forties. Presbyopia is when a person's eyes lose their natural flexibility for focusing on near objects, also referred to as a decline in accommodative ability. The range of accommodation is the distance (measured from the eye) to which an object can be carried toward the eye and kept in focus, and the power of accommodation is the dioptric equivalent of this distance, a standard unit of measurement in the ophthalmic field.

This loss of accommodation is believed due, at least partly, to a hardening of the lens of the eye with age. Normal eyesight can deteriorate to the point where at age 55, sharply focusing on anything within three feet is not possible without aid. As a consequence, most older people eventually require spectacles to assist them in short-distance vision, in order to see clearly when reading or doing close work. Several products are available for this purpose, including reading spectacles, bi-focals, and multi-focal or progressively graded spectacles. Each of these approaches has its own drawbacks or limitations while working with computers.

The nature of a computer work station is such that the computer monitor screen is usually located within the area a person with presbyopia would need bifocals, but is higher in the viewing plane than is corrected by such lenses. This leads to repeated head bobbing, as well as leaning forwards or backwards, in order to focus on the monitor, the key board, and possibly even a copy stand or document holder. Moreover, reading spectacles or bi-focals are limited to a single diopter power optimally designed for reading at a single predetermined distance. Computer screens may be positioned at a different distance (often a greater distance) from the eye than the distance a book is typically placed, particularly at certain moments when the computer operator increases his or her distance from the computer in order to view another object, such as a document or file on an adjacent desk. Moreover, the stronger the lens in bifocals or reading spectacles, the shorter will be the patient's range of focus. The loss of range can present difficulties to the computer operator who must see the computer screen, the keyboard and a documents at various distances.

Progressively graded spectacles allow correction for a continuum of distances, and have the advantage of permitting the user to instantaneously change focus in accordance with a change in viewing angle. With progressively graded lenses, however, focal distance strictly depends on the direction of viewing which is not necessarily commensurate with environmental requirements. The largest power grading typically starts at low angles for reading, and becomes gradually lower for higher angles and thus longer distances. In general, the extent of such a power variation is about 2.5–3 diopters from the lowest to the highest viewing angle. This variation of power as a function of viewing angle, as dictated by any progressive grading technique, is restrictive because the objects in an environment viewed by an observer rarely exhibit a spatial positioning that is exactly complementary to the grading. In most scenarios, the line of sight of a near object is lower than that of more distant objects, but this is not always the case. Consequently, viewing a computer screen at the same time as a document at a lower position may not be possible without an unnatural or inconvenient tilting of the head of the wearer, and this may increase the chances of an ergonomically poor posture or movement.

Various types of optical apparatus have been proposed to alleviate or reduce the eyesight difficulties of presbyopic and non-presbyopic individuals involved in working with computer screens. Such optical apparatus are commonly placed between the operator and the computer screen in order to magnify the screen. For example, U.S. Pat. No. 4,712,870 to Robinson and U.S. Pat. No. 4,577,928 to Brown disclose the use of Fresnel lenses that are interposed between the monitor and the operator to magnify the monitor screen image. An adjustable lens holder for a magnifying lens in the context of a computer screen is also disclosed in U.S. Pat. No. 4,529,268 to Brown, and U.S. Pat. No. 4,958,907 to Davis.

Although such prior-art image magnification devices may provide certain benefits, they suffer from serious deficiencies and limitations which have certainly limited their popularity. One problem with such prior-art magnifiers is that they employ Fresnel lenses. While having the advantage of being lightweight and inexpensive, Fresnel lenses have the disadvantage of exhibiting a pattern of fine concentric circles or the like that is cut into the surface of the lens in order to flatten the lens shape, which pattern is unattractive and detracts from the clarity of detail seen through the lens. Furthermore, a Fresnel lens placed relatively close to a computer screen does not adequately help presbyopes, because although the lens enlarges the lettering, the lettering remains fuzzy and cannot be brought into sharp focus. While a Fresnel lens with a larger focal distance may be placed a greater distance from the computer screen, the clarity of a Fresnel lens tends to decrease with increasing distance from the screen or object being magnified.

Another problem with prior-art computer magnifiers has been that they do not adjust very well to the changing positions of a computer operator and/or to the changing visual needs of the operator. For example, different persons in the same family may use the same computer monitor at home, or different persons in the same work group, or a temporary substitute, may use the same computer monitor at the office. Or the same person may have different visual needs when performing different computer tasks or viewing different images. Prior-art magnification devices may provide for adjusting the lens location to some extent, but the adjustment may be discontinuous or lacking in certain directions, and the range of lens movement may be relatively limited.

Another problem that persons encounter when using computer screens is that it may not be possible for an entire page of a document or drawing to be contained within a single visual display on the computer screen without the visual display or its details becoming too small to see without difficulty. For example, an entire spreadsheet or engineering drawing may be too small to "read" when viewed in its entirety on a computer screen. Thus, instead of viewing the page of a drawing or spreadsheet at one time (as an integral whole), it may be necessary to view the page in parts, for example, by tabbing back and forth, or up and down, along the page in order to sequentially change the part of the page being viewed at any given point in time.

It would be highly desirable to provide an optical device for use at a computer work station to magnify the image on a monitor screen while providing adequate flexibility for readily adjusting to the ergonomic and visual needs of the operator.

It would be highly desirable to provide an optical device for use at a computer monitor that would, in effect, increase the effective size of a screen, for example, that would increase the size of print on a smaller 13-inch monitor to the size of print on a larger 17-inch monitor, so that a smaller monitor can be viewed with the same ease as a larger monitor.

It would be highly desirable to provide an optical device that would allow computer operators to see more information on a computer screen than would otherwise be possible (in spreadsheets, drawings, schedules, and financial information.) It would be highly desirable to provide an optical device that would allow computer operators to more easily view, at one time in a single image, an entire page that otherwise could only be viewed in parts.

It would be highly desirable to provide an optical device for use with a computer monitor that would enable operators having presbyopia to more easily and more clearly see screen images.

It would be highly desirable to provide an optical device for use with a computer monitor that would provide for adjusting the position of a magnification lens in a manner that quickly and filly responds to the changing needs of the same or different computer operators.

It would also be advantageous to provide such an optical device that could be readily and conveniently retrofitted to existing computer work stations.

SUMMARY OF THE INVENTION

The present invention is directed to apparatus and methods for magnifying the screen of a computer monitor, video display terminal, or the like. The invention is especially useful for a computer work station to enable a worker to magnify the visual display on a screen of a computer monitor. The apparatus comprises an adjustable arm for supporting a magnifying lens between the worker and the screen of the computer monitor viewed by the worker.

The adjustable arm comprises (1) a vertical structural unit that is attached to a base support, preferably in back of the computer monitor with respect to the operator, which vertical structural unit extends in a generally vertical direction from said base support, preferably to a vertical position higher than the back of the computer monitor, (2) a horizontal structural unit that is attached to the upper end of the vertical structural unit in an elbow and which horizontal structural unit extends past the computer monitor to a position in front of the computer with respect to the worker. The far end of the horizontal structural unit is attached to the magnifying lens in front of the screen. The adjustable arm is supported independently of the operator's body by a weight that is equal to or greater than the total weight of the computer monitor. In other words, the adjustable arm is attached to a base support, the horizontal planar surface of which is below the computer monitor such that the full weight of the computer monitor can be used to counterbalance the force exerted by the arm at its attachment to the base support. This arrangement supports a non-Fresnel lens at a variable distance from the monitor screen.

Preferably, the magnifying lens is continuously movable in a vertical, horizontal and axial direction. The lens has a combination of properties that, in the context of a computer screen and adjustable positioning, allows presbyopic operators to more clearly and more easily see the images on a computer screen.

The optical device of the present invention can prevent or reduce eyestrain, back pain, and other such problems caused by extensive use of a video or computer screen. It provides greater flexibility for meeting the visual or ergonomic needs of the individual worker. For example, the invention allows a computer operator a greater range of options and positions for viewing the screen through the magnifying lens by providing a greater range and ease of movement of the lens vis-à-vis the screen. The optical device also enables an operator to obtain an enlarged view of a visual display, which is particularly advantageous for viewing pages of spreadsheets, figures, or the like that are otherwise too small to be viewed as a single image on a screen.

The invention is especially beneficial for presbyopic operators. When viewing screen images through the magnifying lens of the present invention, the amount of eye accommodation necessary to view screen images can be reduced or eliminated, thereby allowing presbyopic operators to see screen images more clearly.

BRIEF DESCRIPTION OF THE DRAWINGS

The other and more specific objects and advantages of the invention will be apparent to those skilled in the art from the following detailed description overall, taken in conjunction with the drawings, in which.

DETAILED DESCRIPTION OF THE INVENTION

The present invention is directed to an optical device for use with a computer monitor or video display terminal. The invention is especially useful for reducing eyestrain caused by viewing the screen of a computer monitor at a computer work station.

By the term "computer monitor" herein is meant apparatus for displaying a visual image for a personal computer or the like. The invention is also applicable, however, to any video display terminal, including television sets and display terminals or monitors connected to video cameras. In general, the invention is useful for viewing an image or visual display on a screen. The term "monitor," as used herein, will generically refer to any type of computer monitor, video display terminal (VDT), cathode ray tubes (CRT), or other electronic device for displaying a visual image.

The present device comprises at least one magnifying lens capable of being adjustably positioned in front of the screen of a monitor for providing an enlarged view of the screen (and the visual image being displayed thereon). The enlargement is designed to reduce computer operator eye strain arising from extended viewing of the screen. The present invention is especially useful for helping presbyopic workers to more easily view the screen of a monitor.

Turning now to the figures, like parts in different figures have the same numbers. A first embodiment of the invention, shown in FIG. 1, comprises a computer monitor 2 shown in a dotted line, which monitor comprises a screen 4, a stand 6 and a cabinet 8. This monitor can be part of a computer work station comprising further computer accessories such as a computer processor, a keyboard, a mouse, a document holder for word processing, and the like. The computer may be placed on a work desk or other flat surface.

Figure 1:
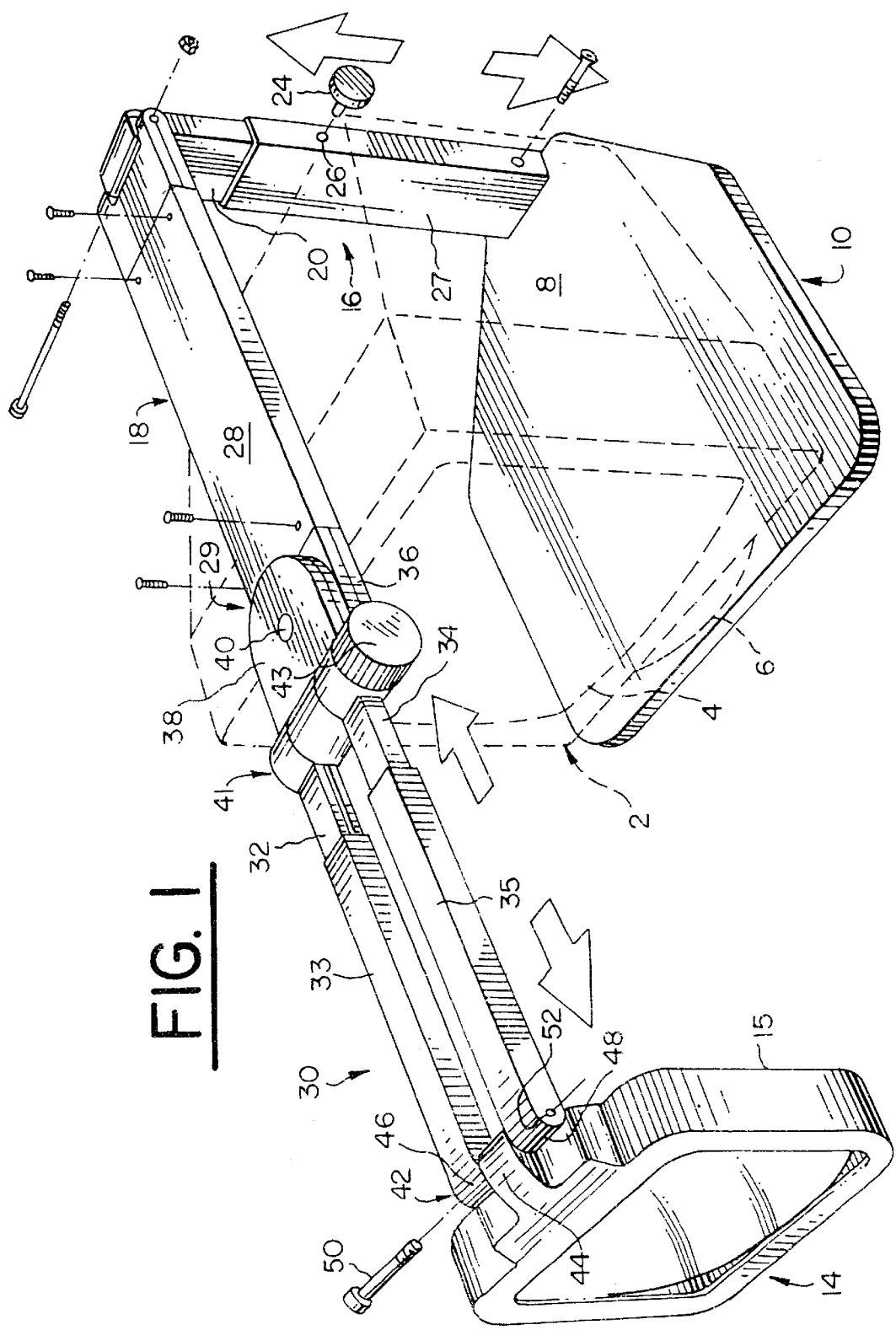
FIG. 1 is a perspective view of a conventional computer monitor that is equipped with one embodiment of an optical device constructed in accordance with the invention.

As illustrated in the embodiment of the invention shown in FIG. 1, the optical device may comprise a platform 10 on which the computer monitor can rest or sit such that the adjustable arm at its point of attachment to the platform is counterbalanced by a force at least equal to the entire weight of the computer monitor as it sits on the platform. This force helps to counterbalance the weight of the magnifying lens at the distal end of the adjustable arm.

The platform 10 may be stationary or may optionally comprise a conventional means for moving or swiveling the platform and computer monitor on the work desk. Preferably, the platform employs a "Lazy Susan" type mechanism. Such mechanisms are well-known and typically comprise two flat pieces of material, a top and bottom piece, one of which rotates in parallel with respect to the other. Typically, the top surface of the bottom piece, in the shape of a wheel or round plate, supports a plurality of ball bearings at the end of bosses arranged in one or more concentric circles. The ball bearings engage the bottom surface of the top piece, which may be the platform 10 or a flat piece attached to the bottom of the platform, such that the platform can rotate around an axis through a center pivot at the point of attachment between the parallel pieces. One such "Lazy Susan" mechanism, for example, is disclosed in U.S. Pat. No. 4,635,894. Such mechanisms are commercially available from a variety of sources.

The platform 10 is typically placed on a computer work desk. In operation, the platform allows the user to rotate the monitor and the lens as one without changing their alignment.

An adjustable arm generally indicated at 12 is designed to hold and adjustably position a magnifying lens 14, within a lens frame 15, in front of the computer screen. In the preferred embodiment, the adjustable arm is movable in front of the screen in a vertical, horizontal and axial direction as explained below, so that the magnifying lens can be adjustably positioned to whatever position is desired relative to the screen, which position may depend on the current position of the worker or on his or her current visual needs. The adjustable arm comprises a means for continuously moving the lens vertically in a direction perpendicular to the surface of the desk or platform, a means for moving the lens axially along, or substantially parallel to, a central axis perpendicularly extending from the plane of the computer screen, and a means for pivoting the magnifying lens, in a horizontal direction, away from a plane extending perpendicular to the base and bisecting the plane of the screen. Preferably, the adjustable arm further comprises a means for changing the angle of the lens with respect to the vertical plane of the computer screen.

In the embodiment shown in FIG. 1, a vertical structural unit 16 is attached to the platform 10 at a position in back of the computer monitor with respect to the operator. Attachment means may consist of vertical ribs that can be injection molded onto the top of the platform which ribs fit into the hollow interior at the bottom of the vertical structural unit. The vertical structural unit extends in a substantially vertical direction from the platform to a vertical position higher than the back of the computer monitor. It is also possible for the vertical structural unit to extend at an angle of up to 60° on either side of the vertical, in order to further counterbalance the arm assembly, for example, as illustrated in U.S. Pat. No. 4,796,162; U.S. Pat. No. 4,080,530, or U.S. Pat. No. 4,391,498. It is also possible, but less convenient, to attach the vertical structural unit to a base position at the side of the monitor or to form, from two or more vertical structural units, a bridge over the top of the computer. It is also possible to attach a vertical structural unit to the front of the platform, at an angle of up to 60 degrees from the horizontal, preferably about 30 degrees from the horizontal, with the lens being positioned above the axis of the vertical structural unit.

In the embodiment of FIG. 1, a horizontal structural unit 18 is pivotally attached to the upper end of the vertical structural unit and extends above and over at least a portion of the computer monitor to a point in front of the computer screen with respect to the computer operator or worker. The distal end of the horizontal member is attached to a magnifying lens. (The terms "distal" and "proximate," as used herein, is in reference to the point at which the adjustable arm is supported its base position.) It is noted that the adjustable arm is supported independently of the operator's body and that a weight at least equal to the entire weight of the monitor is used to support or counterbalance the adjustable arm.

In the embodiment of FIG. 1, the vertical structural unit 16 comprises elongated first and second vertically disposed members 20 and 22, wherein a first vertically disposed member 20 is adapted to slidably and vertically telescope within a tubular second vertically disposed member 22 having a slightly greater cross-sectional diameter. This allows for monitors of different height to be accommodated. The vertical position of the first vertically disposed member is capable of being fixed by means of a removable bolt or stop means 24 that horizontally fits into alignable apertures, one of which is shown at 26, in both the first and second vertically disposed members. Each elongated vertically disposed member may have a rectangular cross-sectional shape and four elongated sides, although circular or other cross-sectional shapes are suitable.

An elbow connects the vertical structural unit with a horizontal structural unit 18, the latter comprising a horizontal extension member or beam 28 that, in turn, is connected to an axial adjusting means 30 for continuously moving the lens towards or away from the screen. The elbow is preferably attached to the beam 29 by a frictionless pivot. This allows for slight height variations among monitors once the initial height is selected. The elbow connection holds the proximate end of the beam 29 down as the distal end of the beam rests forward on the front edge of the monitor. The rotation of the frictionless pivot preferably allows the beam 28 to be moved parallel to the vertical structural unit, so that the adjustable arm can fold into a compact package for transport or handling.

The axial adjusting means 30 in the embodiment of FIG. 1 comprises a first and second pair of horizontally disposed tubular members or pieces, two inner tubular pieces 32 and 34 and two outer or enveloping tubular pieces 33 and 35. Each inner tubular piece is adapted to slidably telescope within the corresponding outer tubular piece which has a slightly greater cross-sectional dimension. The tubular pieces are preferably either circular or rectangular in cross-section.

In operation, the height of the vertical structural unit 16 may be adjusted so that the horizontal structural unit 18 extends above the computer monitor with the bottom surface of the horizontal structural unit at intermediate position, between the elbow and the lens, resting on the front edge of the monitor supporting the adjustable arm and the lens. For this purpose, the bottom surface of the horizontal extension member 28 where it rests on the monitor may have one or more rubber or plastic pads to soften its placement on the top front end of the cabinet. Alternatively, a saddle bracket or nesting device attached to the top of the computer may be used to secure the horizontally extending member in place on top of the computer, so that the adjustable arm stays in place where it rests on the monitor, for example, preventing lateral motion of the extension member.

A side pivoting means 29 for continuously pivoting the lens horizontally away from the computer screen comprises, in the embodiment of FIG. 1, an upper pivoting plate 38, at the rounded proximate end of the axial adjusting means, having a flat bottom surface which slidably pivots horizontally sideways with respect to a flat upper surface of a stationary lower pivoting plate 36 at the distal end of the horizontal beam 28. The upper and lower pivoting plates are connected by a pivot connector 40. In operation, horizontal pivoting rotation allows the user to easily move the lens to the side of the monitor out of use at any time. This rotation can also be used to fold the adjustable arm into a compact package, so that the axial adjusting means 30 can be rotated 180 degrees to a position over the horizontal beam 28.

The adjustable arm in FIG. 1 further comprises a vertical adjusting unit 41 comprising a tension knob 43 attached to an axle inside the unit and extending the axial length of the unit. The vertical adjusting means in FIG. 1 comprises two torsion springs having a circular spring coil and two straight ends at an angle between 90 and 180 degrees. The center of each spring coil surrounds the axle. One of the two straight ends of the spring coil is positioned inside a tubular member 32 or 34 and the other straight end is positioned in the pivoting plate 38 such that lowering the lens increases the angle between the straight ends of the spring coil. The tension knob fixes the vertical position of the lens by tightening the fit of the rotatable cylindrical ends of the tubular members 32 and 34 pieces around the stationary middle cylindrical hub 43. In operation, by loosening the tension knob, the arm can rotate up and down about an axis parallel to the platform and perpendicular to the length of the horizontal structural unit, which axis lies between the upper pivoting plate 38 and the axial adjustable portion of the arm.

The adjustable arm may further comprise an angle adjusting means 42 for angularly adjusting the lens with respect to a plane parallel to the computer screen. The angle adjusting means 42 in the present embodiment comprises a vertical projection 44 on the top of the lens frame 15 which is pivotably movable with respect to two stationary side pieces 46 and 48 formed, respectively, by the rounded distal end portions of the tubular pieces 33 and 35, each of which have flat inner surfaces that slidably pivot with the flat outer surfaces of the vertical projection 44. The tubular pieces and the vertical projection on the frame may be bolted together with a bolting means 50 extending through aligned apertures one of which is shown at 52. However, other mechanisms for angularly moving the plane of the lens are possible, as will be readily appreciated by those skilled in the art, for example, like the pivoting mechanism on car mirrors or the adjusting means shown in U.S. Design Patent No. Des. 357,470. In operation, the angle adjusting means can be used to adjust the angle of the lens to the screen. This means can also be used to fold the adjustable arm into a compact package wherein the plane of the lens is at an angle of zero degrees to the tubular pieces of the axial adjusting means.

The magnifying lens 14 suitably has a magnifying power of about 1.2 to 3.0, preferably about 1.5 to 2.5. The lens is preferably a non-Fresnel lens substantially equiconvex, biconvex, or planoconvex in shape. In the case of a planoconvex lens, the plane surface may be designed to face either the operator or the screen, without significantly altering or reducing the performance of the lens. The lens suitably has a focal length of 12 inches to 24 inches, preferably 15 inches to 20 inches. If the focal length is too short, the curvature of the lens becomes too strong and the center thickness too great for the required lens size. If the focal length is too long, the screen is too far away. Such lenses are commercially available from a variety of sources, including E-Tay Corp. (Taiwan) and Jolly-Tone Corp. (Taiwan). The lens may be ground and polished, injection molded, injection-compression molded, or diamond turned and polished.

During use, the distance of the lens to the screen is suitably 8 inches to 20 inches, preferably about 10 inches to 15 inches, and the distance of the lens to the operator's eye is suitably about 2 inches to 8 inches, preferably about 3 to 6 inches. Using both eyes in conjunction, the entire screen should be viewable through the lens. The monitor screen may be 13 inches to 21 inches or more in diagonal length, usually 13 inches to 17 inches in standard diagonal length. The height of the lens is suitably about 35 percent to 85 percent of the height of the screen for which it is designed, preferably about 50 percent to 80 percent of the height of the screen. For a 13-inch or 15-inch diagonal screen, for example, the lens should have a height of about 3 to 7 inches, preferably about 4 to 6.5 inches. For a 17-inch diagonal screen, the height of the lens may be about 3.5 to 8 inches, preferably about 4.5 to 7 inches. For a 21-inch diagonal screen, the lens may be larger. By the height of the lens is meant the height of the clear aperture of the lens, which may approximate the distance from the top to the bottom edge of a preferred lens, as will be understood by the skilled artisan. The width of the lens is preferably equal to the lens height times the aspect ratio of the screen plus the eye separation, the latter about 2.5 inches. The aspect ratio is the ratio of the width of the screen Ws divided by its height Hs. By the distance of the lens to the screen or eye is meant the distance measured from the nearest surface of the lens along its optical axis.

In operation, by adjustment of the position of the lens, the image on the screen can be brought sharply into focus. As an added advantage, the distance can be adjusted so that the screen image appears at infinity. In other words, presbyopes can use the lens to eliminate or reduce the need for eye accommodate to the screen. The position of the lens can be adjusted so that the screen can be viewed by an operator with or without eyeglasses or at various magnifications, according to the operator's preference.

The lens can be made of various transparent materials, including glass and plastic. Suitable lens plastics include styrene, polycarbonate and acrylic polymers such as polymethyl methacrylate (PMMA). A light plastic is preferred to minimize the weight of the lens. PMMA is a preferred plastic to minimize the residual color aberration of the image. The parts of the adjusting arm can be made from metal, plastic or composite materials, including but not limited to steel, wood, and/or injection molded plastics.

The lens frame is used to carry at least one lens, the primary lens. However, more than one lens may be attached to the adjustable arm, either having the same or different magnifying powers. A lens may be substituted with another lens of different power and size, depending on the individual needs of the worker or the particular application. A second lens, attached to the first lens, may be used for reading paper copy.

As described above, the optical device provides a degree of freedom that allows a computer operator to see a larger and sharper image and/or position himself better with respect to the screen or simultaneously with respect to the screen and other more distant or less distant objects. The magnifying lens may be conveniently adjusted to the position that will allow the user to work and see most comfortably.

Figure 2:
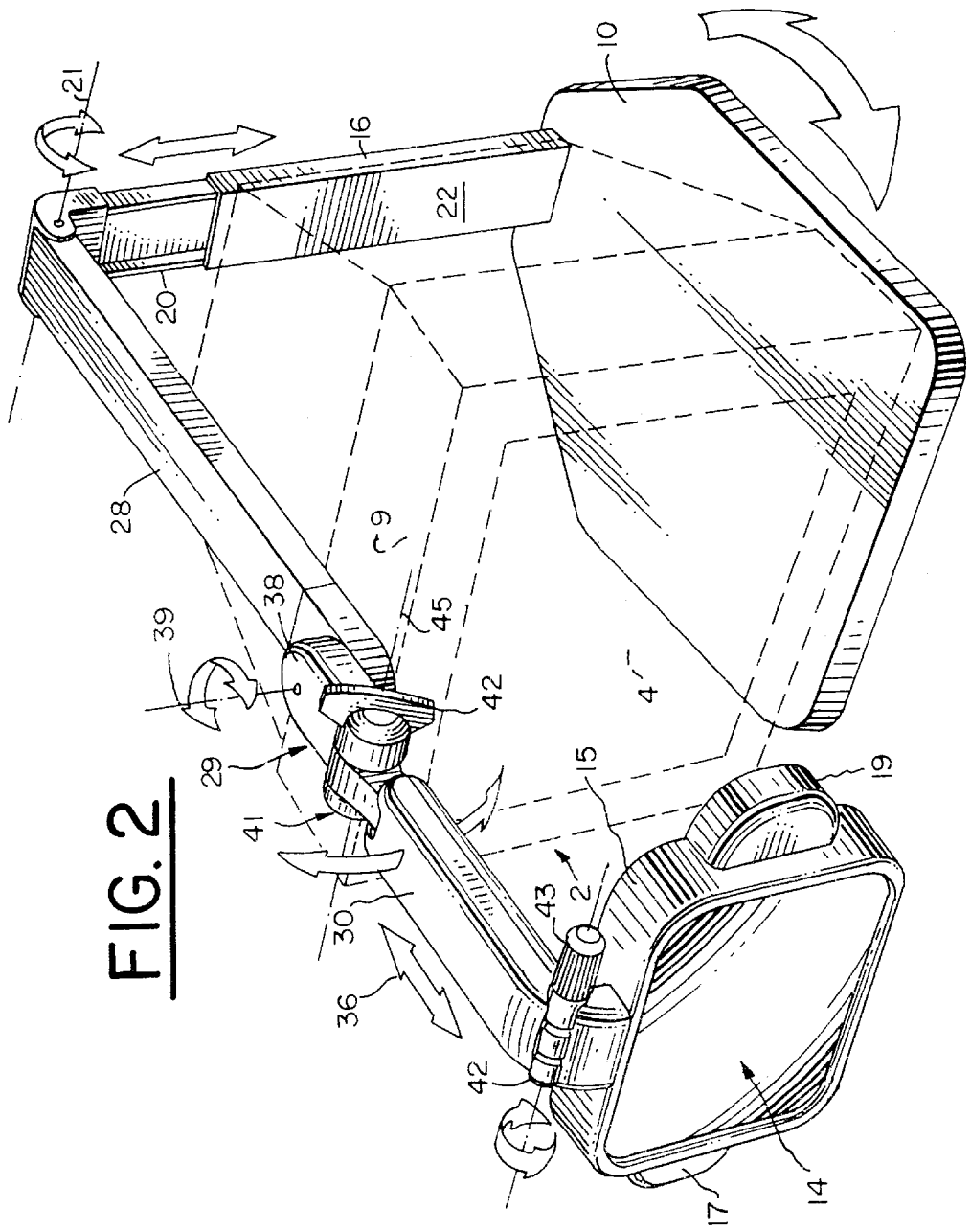
FIG. 2 is a perspective view of a conventional computer monitor that is equipped with a second embodiment of an optical device constructed in accordance with the invention.

Referring now to FIG. 2, a second embodiment of the invention is shown in which a platform 10 for placing a computer monitor 2 supports the bottom of a vertical structural unit 16 which is similar to that in the embodiment in FIG. 1 except that an inner piece 20 is allowed to slide within an outer piece 22 by pressing a release button on the back of the outer piece, as explained more fully below. The vertical structural unit 16 is attached to an extension beam 28 at an elbow having a frictionless pivot that rotates about the axis 21. The distal end of the extension beam 28 is attached to a horizontal adjusting means 29 comprising an upper horizontal plate 38 that rotates around the axis 39, thereby allowing the arm to pivot sideways. The adjustable arm rests on the front edge of the monitor 9, preferably such that the axis 39 intersects the extension beam 28 where its bottom surface rests on the front edge of the monitor 9 on in a nesting device on the computer.

A vertical adjusting means 41 with a tension knob 42 rotates around an axis 45 in order to raise or lower the lens 14 shown in lens frame 15. The lens frame has side gripping means 17 and 19 for more readily moving the position of the lens.

An axially adjusting unit 30 allows the lens to move axially either towards or away from the screen 4 as indicated by the adjacent arrow. The distal end of the unit 30 is connected to an angle adjusting means 42 having a lens angle adjusting knob 43 which allows the user to fix the angle of the lens with respect to the plane of the monitor screen. By loosening the adjusting knob 43, the lens can swing forward and back on a friction pivot controlled by the knob to adjust the angle of the lens to the screen. The embodiment of FIG. 2 can be understood in greater detail by referring to similar parts in FIG. 4 below.

Figure 3:
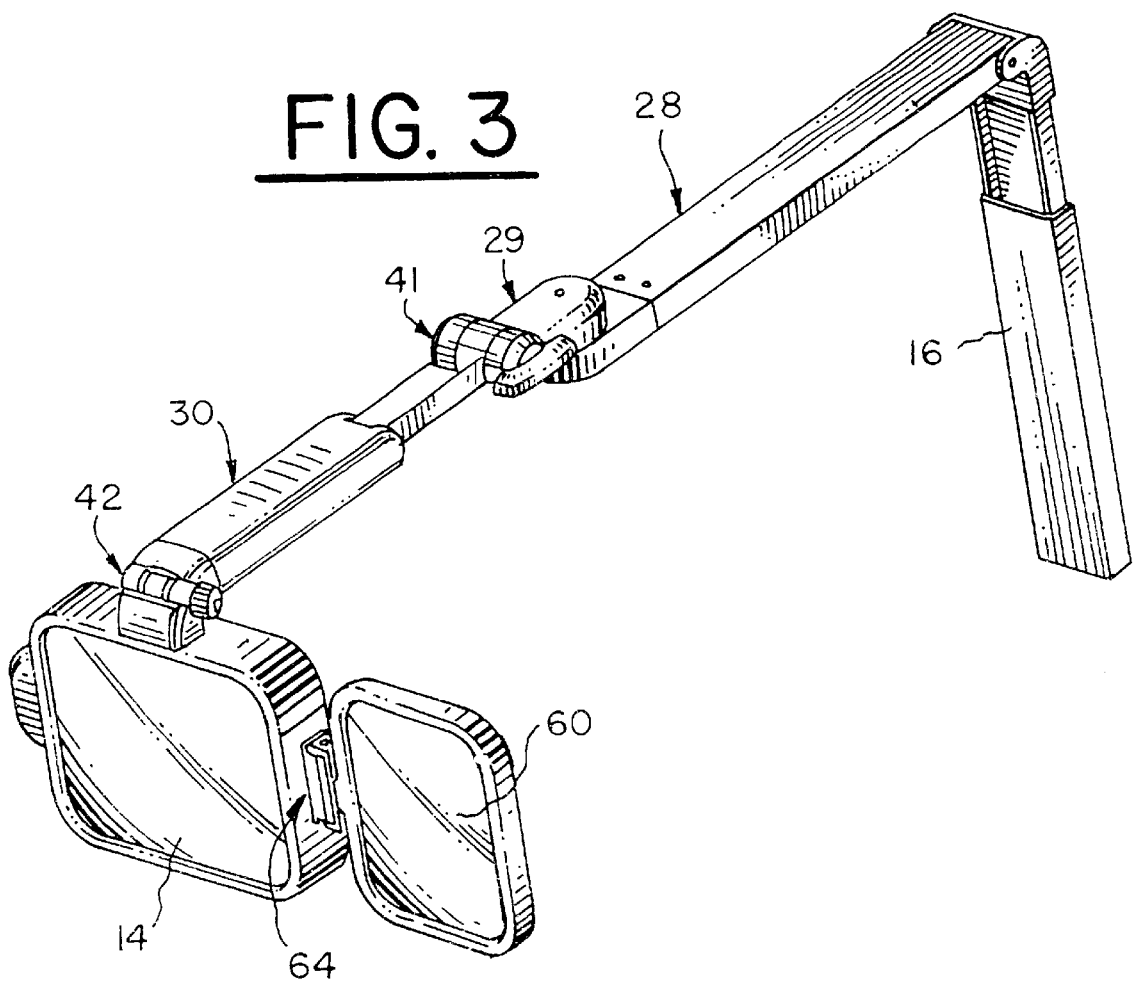
FIG. 3 is a third embodiment of an optical device according to the invention in which an adjustable arm supports both a lens for viewing a computer screen and a side lens for viewing a document.

A third embodiment of the invention is shown in FIG. 3 which differs from the previous embodiment only in having a detachable second lens 60 in addition to the primary lens 14. The frame 62 of the second lens is attached to the frame 15 of the primary lens by means of an inter-lens connecting means 64 that allows the second lens to move at an angle with respect to plane of the primary lens, independently rotating both about an axis horizontally bisecting the second lens and about an axis vertically extending through the length of the inter-lens connecting means 64 between the adjacent sides of the two lenses. In other respects, the vertical structural unit 16, the vertical extension member 28, the side pivoting means 29, the vertically adjusting means 41, the axial adjusting means 30 and the angle adjusting means 42 are essentially identical.

Figure 4:
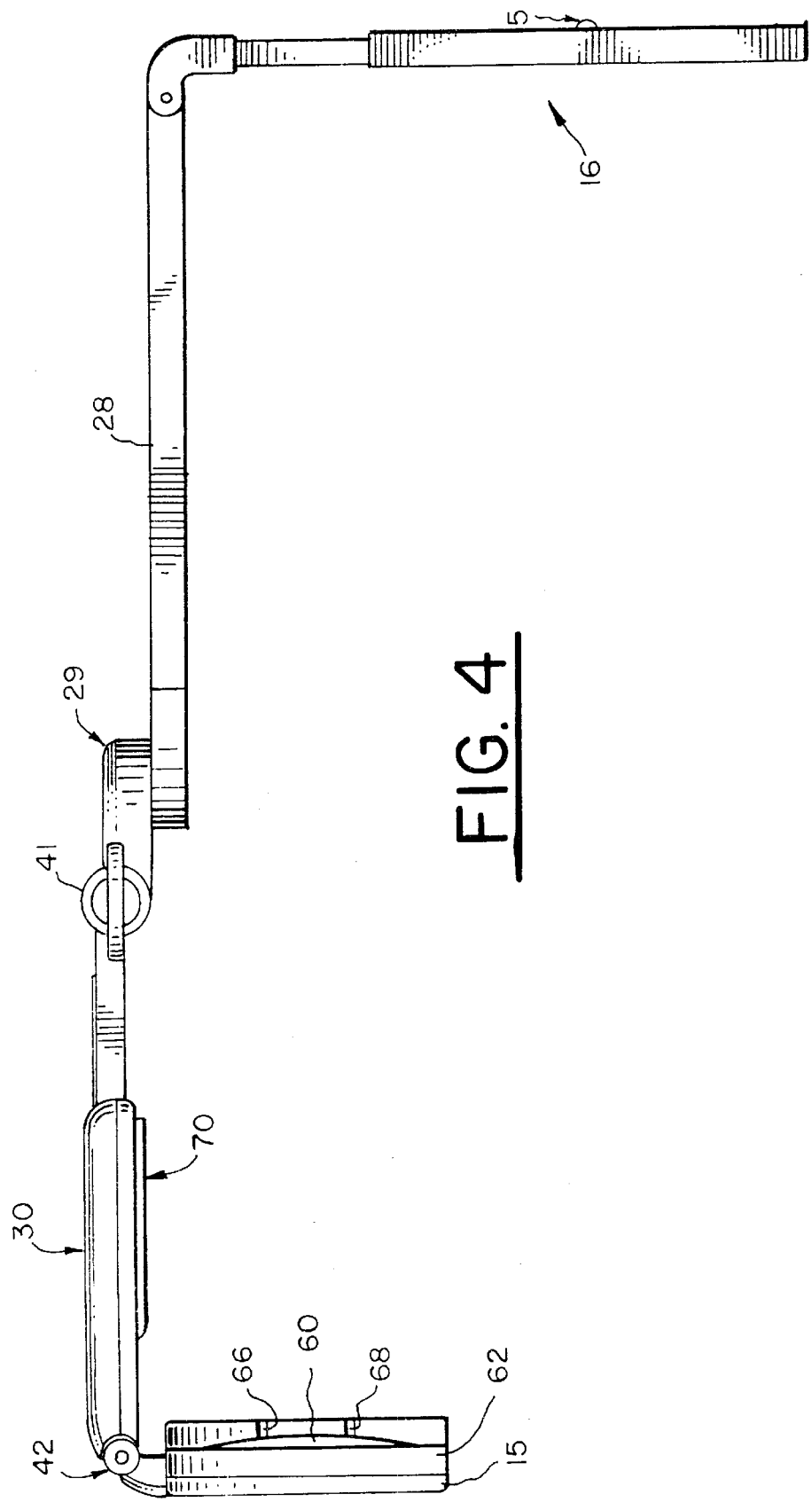
FIG. 4 is a side view of the adjustable arm shown in FIG. 3.

Referring now to FIG. 4, a side view of the optical device of FIG. 3 is shown in which the vertical structural unit 16, including a stop button 5, is shown attached to a horizontal structural unit comprising a vertical extension piece 28, a side pivoting means 29 a vertically adjusting means 41, an axial adjusting means 30 including spring bottom cover 70, and an angle adjusting means 42. The distal end of the adjustable arm supports. a detachable second lens 60 in a frame 62 attached to the frame 15 of the primary lens by means of an inter-lens connecting means (not shown in FIG. 4) inserted into horizontal slots 66 and 68.

Figure 5:
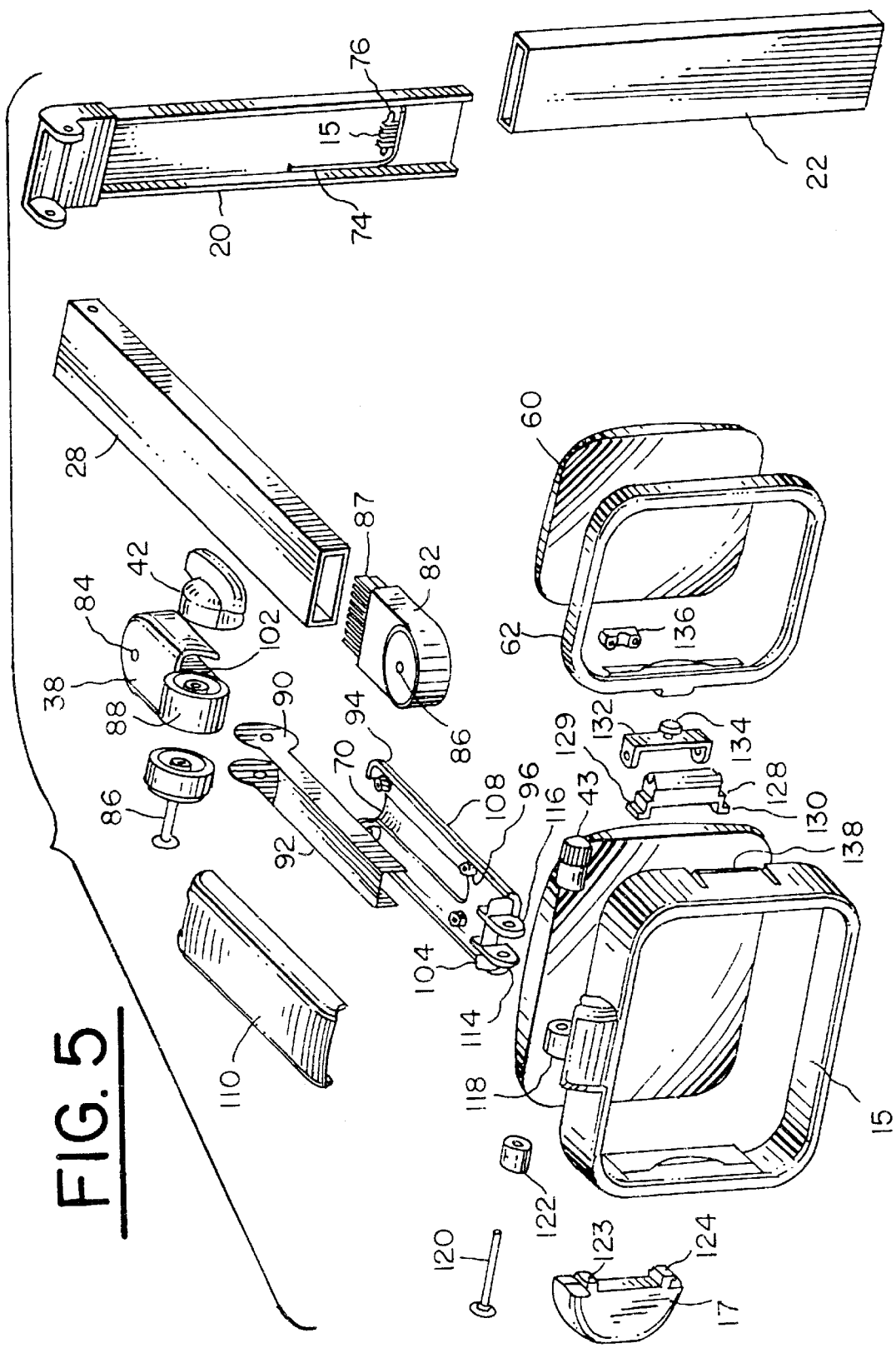
FIG. 5 is an exploded view of the adjustable arm shown in FIG. 3.
Figure 6:
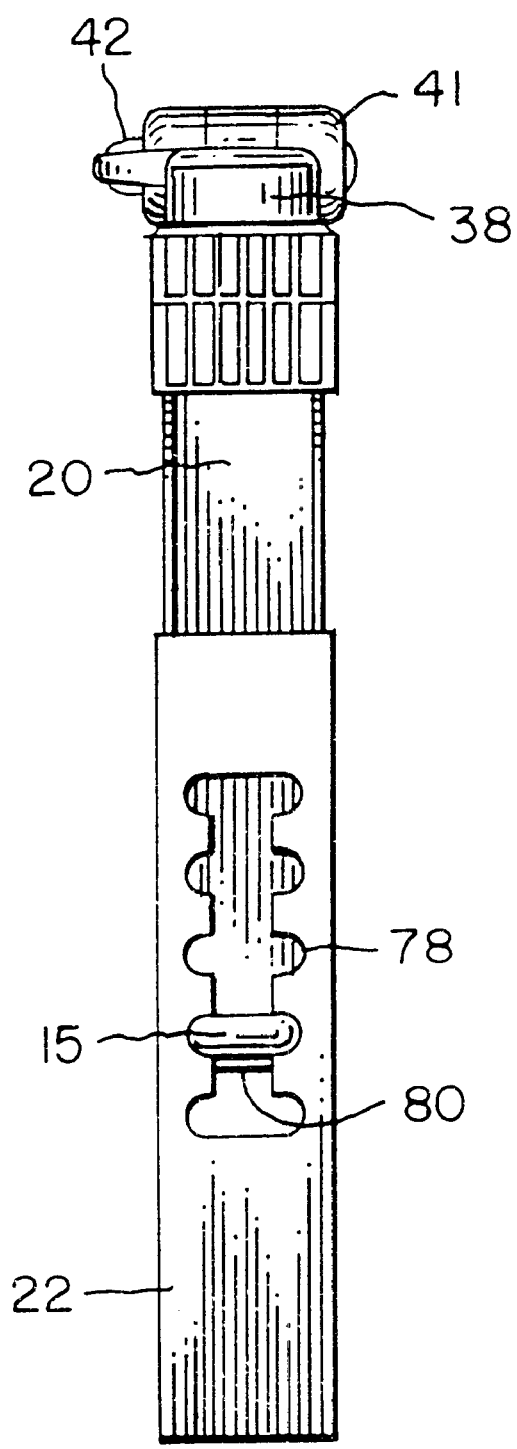
FIG. 6 shows a back view of the adjustable arm of FIG. 3.

Referring now to FIG. 5, the components of the embodiment of FIG. 3 are shown in greater detail. The vertical structural unit 16 comprises an inner elongated piece 20 that slides within a hollow outer elongated piece 22. The back of a release button 15 comprises projections extending through a horizontal slot 76. A U-shaped slot 74 cut in the elongated piece 20 defines a flap such that digital pressure on the front of the release button moves the flap and button backwards (from the direction of pressure), thereby displacing the release bottom from one of a series of slots cut in the back of the elongated piece 22. The release button can then be inserted, as desired, into another slot at a higher or lower position, as may be more fully understood by referring to FIG. 6 which shows a back view of the adjustable arm, in which the front of the release button 15 is shown positioned in one of a contiguous series of vertical slots 78 cut or molded into the surface of the elongated piece 22. The bottom edge 80 of the flap to which the release button is attached is shown through the slot area. The inner piece 20 is shown below the upper rotating plate 38 and the vertically adjusting means 41, including knob 42.

Returning to FIG. 5, the vertical structural unit 16 is for attachment to an extension beam 28 by means of a frictionless pivot, as explained earlier, that allows adjustment of the angle between the vertical structural unit and the extension beam. The distal end of the extension beam 28 is attached to a side pivoting means comprising an upper horizontal plate 38 that rotates around an axis perpendicular to its top surface through aperture 84, thereby allowing the arm to pivot sideways. A bottom horizontal plate 82 has an aperture 86 that can be aligned with aperture 84 for insertion of a connecting pivot means. Ribs 87 at the end of the plate 82 provides a friction fit with the extension piece 28, which may be further secured with rivets. In operation, the bottom of the plate 82 rests on the front edge of the monitor 9. Preferably, the bottom of the plate 82 has at least two rubber pads. Additional means may be used to secure the arm to the top of the monitor. For example, a complementary nesting device or guide piece may be adhesively attached to the top of the monitor such that the bottom of the plate 82 fits into an indentation in the complementary piece, thereby preventing sideways movement of the plate 82.

Figure 7:
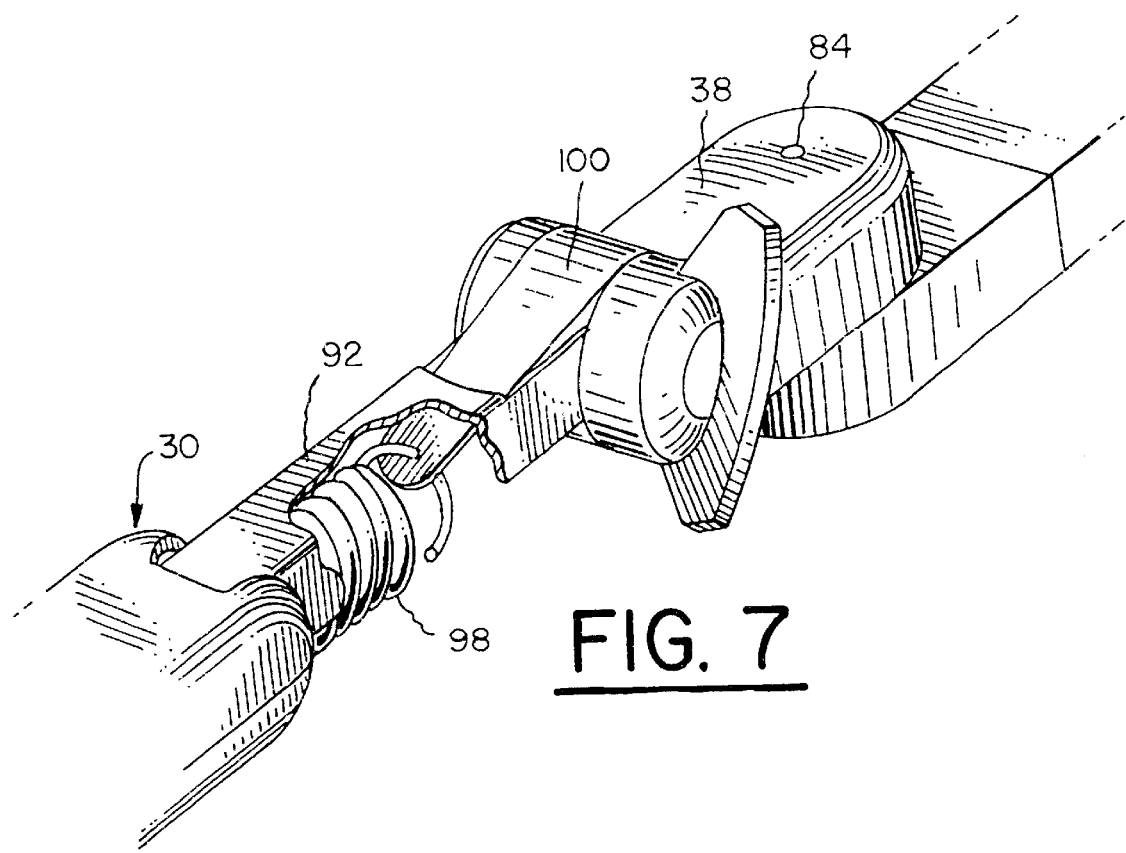
FIG. 7 shows the axial adjustment means for the adjustable arm of FIG. 3 in which illustration a portion of an exterior wall is cut away to show the spring mechanism.

The vertically adjusting means comprises a tension knob 42 for attachment to the axle 86 extending through a center cylindrical hub 88 and the aligned holes in the circular wings 90 of the channel bar 92 which is part of the axially adjusting means. The vertically adjusting means works by means of an extension spring, not present in FIG. 5 but shown in FIG. 7, wherein an extension spring 98 is shown, which may be attached at its distal end to a rivet that extends horizontally through the side walls of the U-shaped channel bar 92, the ends of which rivet also serving to limit the range of motion of the channel bar between stops. The proximate end of the extension spring is attached to a strap 100 in FIG. 7, which strap is preferably metal. The strap is connected at its proximate end to the top inner surface of the upper plate 38 near point 84. As better seen in FIG. 7, the strap extends over a center cylindrical hub 88, and the extension spring is positioned under the channel bar 92 of the axially adjusting means 30.

Figure 8:
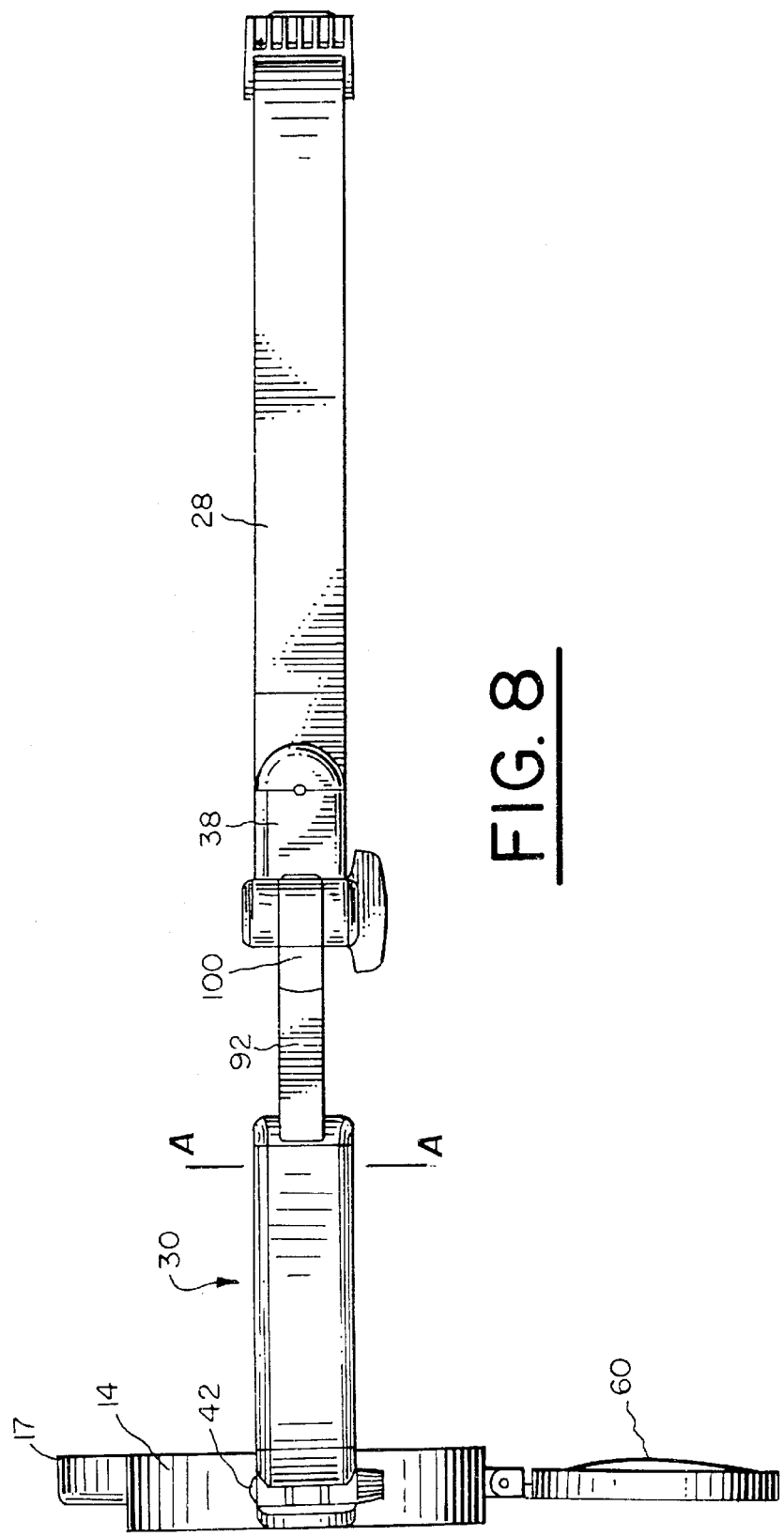
FIG. 8 shows a top view of the adjustable arm shown in FIG. 3.

FIG. 8 shows a top view of the adjustable arm in which the metal strap 100 is shown over the central cylindrical hub 88 extending at one end through a slot in the upper plate 38 and at the other end extending under the channel bar 92 under the top wall of the axially adjusting means 30. The axially adjusting means is shown attached to the angle adjusting means 42 which is shown attached to the frame of the primary lens 14. The second lens 60 is shown at one side of the primary lens and the gripping means 17 is shown attached to the other side of the primary lens.

Returning now to FIG. 5, the central cylindrical hub 88 is held in place by a contiguous (preferably integrally molded) pair of vertical walls in the upper plate 38, one of which walls is shown at 102. In operation, when the arm is vertically pivoted downwards, the extension spring, which is seated in the channel groove 70 in the bottom wall 108, stretches to provide appropriate resistance. When the arm is vertically pivoted upwards the extension spring relaxes.

The axially adjusting means, in addition to the channel bar 92, comprises an upper wall 110, a lower wall 108, and a side wall 104. Stops 94 and 96 on each side of the channel bar limit the axial movement of the channel bar which slidably moves along the top inner surface of the bottom wall. A side stop on each side of the channel bar (not shown) allow the channel bar to move axially between the limiting stops 94 and 96.

Figure 9:
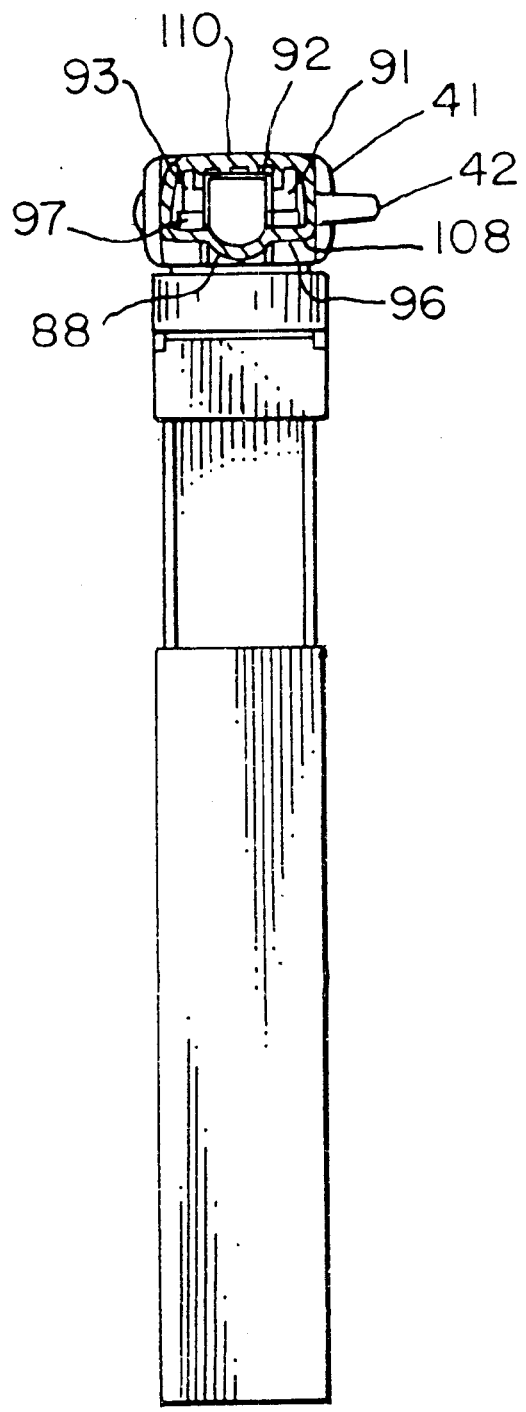
FIG. 9 shows a cross-section of the adjustable arm through the, axial adjusting means along line A—A of FIG. 8.

Referring to FIG. 9, a partial cross-sectional view of the adjustable arm through the axial adjusting means is shown. The cross-sectional view is taken along line A—A of FIG. 8. FIG. 9 shows, in back of the cross-sectional view, the vertical adjusting means 41 with tension knob 42 and center cylindrical hub 88. In the cross-sectional view, the axial adjusting means comprises a channel bar 92, bottom wall 108, and top wall 110, the latter comprising a clam-shell type assembly. The extension spring, which extends between the channel bar and the channel groove 106 is not shown. Stops 96 and 97 in back limit the motion of the channel bar towards the screen. Bosses 91 and 93, extending from the top wall 110 meets the top of the stops 96 and 97, such that a screw entering through the bottom wall, and extending through a stop and connecting boss, can hold the top and bottom walls together.

Returning once more to FIG. 5, the angle adjusting means comprises side-wall wings 114 and 116 that slidably engage with a arm-connecting piece 118 on the lens frame 15. A bolt means 120 alignably connects apertures in an end piece 122, the arm-connecting piece 118, and the lens angle adjusting knob 43, such that turning the knob tightens the connection and thereby fixes a desired angular position. The frame 15 is attachable to a gripping means 117 by means of L-shaped flanges 123 and 124 that slidably engage with horizontal slots in the side of the lens frame. The other side of the lens frame 15 is attachable to a lens-connecting piece 128 for a second lens, which connecting piece also has L-shaped flanges 129 and 130 for a snap-fit insertion into grooves in the side of the lens frame 15. An edge 138 between grooves is beveled out at an angle for a snap fit. The lens-connecting piece 128 is attached to a hinge connector 132 which can rotate either along its longitudinal axis or along the shank axis of swivel connector 134 which is affixed to the frame 62 for lens 60 by means of a bracket means 136.

The lens 60 may have the same properties as the primary lens except that it may be somewhat smaller, especially in width, for viewing documents of smaller width than the screen. Optionally, in order to shorten the width of the lens 60, eye separation may not be taken into account in designing the lens, so that the paper copy cannot be viewed in its entirely in conjunction with both eyes (at the same time). A document or copy holder, a number of which are commercially available, may be unattached or attached to the computer monitor, preferably at about the same distance from the viewer as the screen. For example, the document holder may comprises a flat back surface for resting a sheet of paper, which paper can be help in place with a clip. One example of a document holder attached to a computer monitor comprises a U-shaped adjustable bracket arm attached over the top of the monitor cabinet. One of the vertically downwardly extending portion of the bracket arm may hingedly attach to the side of a page holder for supporting it adjacent to the monitor screen. One or two bracket knobs may provide a means for adjusting the bracket arms to securely fit around the top of the monitor cabinet. The back surface of the document holder, when not in use, may be pivoted to lie substantially parallel to the side of the monitor, or when in use, may be pivoted to lie substantially perpendicular to the side of the monitor, or alternatively at a slight angle to the plane of the screen, in order to provide a surface for clipping or resting one or more sheets of paper.

The advantages and improved results furnished by the method and apparatus of the present invention are apparent from the foregoing description of the preferred embodiments of the invention. Various changes and modifications may be made without departing from the spirit and scope of the invention. Having described our invention in such terms as to enable those skilled in the art to understand and practice it and having described the presently preferred embodiment thereof,

We claim:

1. An optical device to magnify the visual display on a screen of a monitor, the device comprising an adjustable arm for supporting at least one magnifying lens positioned between the screen of the monitor and an operator who is viewing the screen, which adjustable arm is movable for adjusting the position of the magnifying lens, the optical device comprising:
   a) a platform on which the monitor rests,
   b) an adjustable arm comprising (i) a vertical elongated structural unit that is attached to the platform and that extends in a substantially vertical direction from said platform to a vertical position higher than the back of the monitor, and (ii) a horizontal elongated structural unit that is attached to the upper end of the vertical elongated structural unit and that extends in a substantially horizontal direction to a point in front of the monitor with respect to the operator, wherein a bottom surface portion of the horizontal elongated structural unit rests on the top of the monitor, and
   c) a magnifying lens attached to the distal end of the horizontal elongated structural unit of the adjustable arm, which lens is for providing a magnified view of the screen of the monitor, wherein the lens is movable at least vertically and axially with respect to the screen of the monitor.

2. The optical device of claim 1, wherein the platform rotates around an axis that is perpendicular to the surface of the platform on which the monitor rests.

3. The optical device of claim 1, wherein the platform is stationary.

4. The optical device of claim 1, wherein the vertical member is attached to the platform at a position in back of the monitor with respect to the operator and extends above and over the monitor to a point in front of the monitor with respect to the operator.

5. The optical device of claim 1, wherein the platform is designed to support the entire weight of a monitor, the bottom of the platform resting on a table or on a computer processing unit which in turn rests on a table.

6. The optical device of claim 1, wherein the lens is a non-Fresnel lens having a magnifying power of about 1.2 to about 3.0, a focal length of about 12 inches to 24 inches, and a height of about 3 to 8 inches.

7. The optical device of claim 1, wherein the lens is adapted for viewing the entire screen at a distance from the lens to the screen within the range of 8 to 20 inches.

8. The optical device of claim 1, wherein the lens is a non-Fresnel lens having a magnifying power of 1.5 to 2.5, a focal length of 15 to 20 inches, and a height of 4 to 7 inches.

9. The optical device of claim 7, wherein the lens is adapted for viewing the entire screen at a distance from the lens to the screen within the range of 9 to 15 inches from the screen.

10. The optical device of claim 1, wherein the lens is made from an acrylic polymer.

11. The optical device of claim 1, further comprising a means for moving the lens horizontally sideways with respect to the monitor screen and a means for adjusting the lens angularly with respect to the plane of the monitor screen.

12. An optical device for magnifying visual displays on a screen of a monitor, the optical device comprising:
   a) a means for attaching an adjustable arm to a base support under the monitor, the base having a flat surface on which the computer directly or indirectly rests,
   b) an adjustable arm for supporting at least one magnifying lens between the operator viewing the screen and the screen of the monitor, which adjustable arm is movable in a vertical, horizontal and axial direction with respect to the screen, so that the magnifying lens can be adjustably positioned to a desired position relative to said screen, the adjustable arm comprising:
      (i) a means for moving the lens vertically in a direction perpendicular to the base support,
      (ii) a means for moving the lens towards or away from the screen along, or substantially parallel to, a central axis perpendicularly extending from the center of the screen,
      (iii) a means for pivoting the lens sideways from either side of a vertical plane that bisects the plane of the screen, and
      (iv) a means for angularly adjusting the lens with respect to the plane of the screen, wherein means (i), (ii), (iii), and (iv) are each independently adjustable, and
   c) a non-Fresnel magnifying lens for providing a magnified image of the visual display on the screen.

13. The optical device of claim 12, wherein the means for moving the lens vertically rotates about an axis that is parallel to both the screen and the flat surface of the base support.

14. The optical device of claim 13, wherein the means for moving the lens vertically in a direction perpendicular to the base support comprises an elongated piece adapted to slidably telescope within a stationary tubular piece of larger cross-sectional dimension, the vertical position of the elongated piece capable of being adjustably fixed above the second tubular piece to a preselected point above the back of monitor.

15. The optical device of claim 12, wherein the means for moving the lens towards or away from the screen comprises at least one horizontally disposed elongated piece that slidably moves with respect to another piece of greater cross-sectional dimension.

16. The optical device of claim 12, wherein the means for continuously pivoting the lens sideways from the vertical axial plane comprises a substantially horizontal top and bottom plate, the top surface of the bottom plate slidably engaging with the bottom surface of the top plate, and wherein the top and bottom plates are connected by a pivot means such that the top plate rotates about an axis perpendicular to the surfaces of the plates.

17. The optical device of claim 12, wherein the means for angularly adjusting the lens with respect to a plane parallel to the screen of the monitor comprises a projection on the top of the lens frame that pivots along an axis parallel to both the base and the computer screen.

18. A method of magnifying a visual display on a screen of a monitor, the method comprising:
   a) supporting a non-Fresnel lens at one end of an adjustable arm,
   b) attaching the other end of the adjustable arm to a blade support under the monitor, the base support having a flat surface on which the weight of the computer directly or indirectly rests, and
   c) viewing the visual display on the screen through the non-Fresnel magnifying lens while adjusting the position of the lens relative to the screen in order to obtain a desired magnification and clarity of the visual display, wherein the adjustable arm provides for movement of the lens (I) vertically in a direction perpendicular to the base support, (ii) axially towards or away from the screen along, or substantially parallel to, a central axis perpendicularly extending from the center of the screen, (iii) horizontally sideways from either side of a vertical plane that bisects the plane of the screen, and (iv) angularly with respect to the plane of the screen, wherein the movements (I),(ii),(iii), and (iv) are each independently adjustable in a continuous range of movement.

19. An optical device for magnifying visual displays on a screen of a monitor, the optical device comprising:
   a) a platform adaptable for resting a monitor,
   b) an adjustable arm attached to the platform for supporting a non-Fresnel magnifying lens between the screen of the monitor and an operator viewing the screen, which adjustable arm is continuously movable in front of the screen in a vertical, horizontal and axial direction with respect to the screen, so that the magnifying lens can be adjustably positioning to a desired position relative to said screen, the adjustable comprising:
      (i) a means for continuously moving the lens vertically in a direction perpendicular to the base,
      (ii) a means for continuously moving the lens towards or away from the screen along an axis along or substantially parallel to the a central axis perpendicularly extending from the center of the screen,
      (iii) a means for continuously pivoting the lens sideways from a vertical plane extending through the central axis of the screen, and
   c) a non-Fresnal magnifying lens for providing a magnified image of the visual display on the screen of the monitor.

20. An optical device for magnifying visual displays on a screen of a monitor, the optical device comprising:
   a) a first non-Fresnel magnifying lens for providing a magnified view of the visual display on the screen of the monitor, and
   b) a second non-Fresnel magnifying lens for providing a magnified view of a document, wherein one side of a relatively small lens frame holding the second non-Fresnel lens is attached to one side of a relatively large lens frame holding the first non-Fresnel lens, and wherein the second non-Fresnel lens can rotate angularly with respect to the first non-Fresnel lens about at least one axis,
   c) an adjustable arm for supporting the first and second non-Fresnel magnifying lenses, which adjustable arm is continuously movable in front of the screen in a vertical, horizontal and axial direction with respect to the screen, so that the first non-Fresnel magnifying lenses can be adjustably positioned to a desired position relative to said screen, the adjustable arm being capable of moving the lens (i) vertically in a direction perpendicular to the base, (ii) axially towards or away from the screen along an axis along or substantially parallel to the a central axis perpendicularly extending from the center of the screen, and (iii) horizontally sideways from a vertical plane bisecting the screen.

21. The optical device of claim 20, wherein the second non-Fresnel lens can rotate along the longitudinal axis of a hinge connecting the sides of the two lens frames.

22. The optical device of claim 21, wherein the second non-Fresnel lens can also rotate along an axis that horizontally bisects the plane of the lens.

23. The optical device of claim 20, wherein the second non-Fresnel lenses is relatively smaller in width than the first non-Fresnel lens, but wherein both lenses have a magnifying power of about 1.2 to about 3.0 and a focal length of about 12 inches to 24 inches.

* * * * *

UNITED STATES PATENT AND TRADEMARK OFFICE
CERTIFICATE OF CORRECTION

PATENT NO. : 6,417,894 B1
DATED : July 9, 2002
INVENTOR(S) : James A. Goff, Carl Fisherman, Howard Scott Ryan and Paul Eric Carlson It is certified that error appears in the above-identified patent and that said Letters Patent is hereby corrected as shown below:

Column 15,
Line 5, replace the word "blade" with -- base --.
Line 14, replace "(I)" with -- (i) --.
Line 22, replace "(I)" with -- (i) --.

Signed and Sealed this

Nineteenth Day of November, 2002

*Attest:*

*Attesting Officer*

JAMES E. ROGAN
*Director of the United States Patent and Trademark Office*